United States Patent
Arora et al.

(10) Patent No.: US 11,644,853 B2
(45) Date of Patent: May 9, 2023

(54) POWER DELIVERY SYSTEM HAVING LOW- AND HIGH-POWER POWER SUPPLIES

(71) Applicant: Advanced Micro Devices, Inc., Santa Clara, CA (US)

(72) Inventors: Sonu Arora, Princeton, NJ (US); Michael Arn Nix, Austin, TX (US); Moises E. Robinson, Austin, TX (US); Xiaojie He, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/723,920

(22) Filed: Dec. 20, 2019

(65) Prior Publication Data

US 2021/0191435 A1 Jun. 24, 2021

(51) Int. Cl.
*G05F 1/46* (2006.01)
*G05B 19/042* (2006.01)
(Continued)

(52) U.S. Cl.
CPC ............ *G05F 1/46* (2013.01); *G05B 19/042* (2013.01); *G05F 1/10* (2013.01); *G05F 1/625* (2013.01);
(Continued)

(58) Field of Classification Search
CPC ..... G05F 1/00; G05F 1/10; G05F 1/46; G05F 1/461; G05F 1/462–468; G05F 1/56; G05F 1/562; G05F 1/563; G05F 1/565; G05F 1/567; G05F 1/575; G05F 1/59; G05F 1/595; G05F 1/613; G05F 1/614; G05F 1/618; G05F 1/625; G05F 1/63; G05F 1/66; G05B 19/00; G05B 19/02; G05B 19/04; G05B 19/042; G05B 19/0421;
(Continued)

(56) References Cited

U.S. PATENT DOCUMENTS 5,548,206 A * 8/1996 Soo .................. H02M 3/1588
                                                              323/284
6,023,156 A * 2/2000 Buhler ...................... G05F 1/56
                                                              323/284
(Continued)

OTHER PUBLICATIONS

Veeravalli, A. & Nolan, S. M., "Introduction to Low Dropout (LDO) Linear Voltage Regulators", 15 pgs., 2019 (downloaded from https://www.design-reuse.com/articles/42191/low-dropout-ldo-linear-voltage-regulators.html on Dec. 19, 2019).

*Primary Examiner* — Thienvu V Tran
*Assistant Examiner* — Carlos O Rivera-Perez
(74) *Attorney, Agent, or Firm* — Volpe Koenig

(57) ABSTRACT

A technique for adjusting a power supply for a device is provided. The technique includes detecting a low-power trigger for a device; switching a power supply for the device from a high-power power supply to a low-power power supply; detecting a high-power trigger for a device; and switching a power supply for the device from the low-power power supply to the high-power power supply, wherein the high-power power supply consumes a larger amount of power than the low-power power supply, and wherein the high-power power supply provides a greater amount of noise reducing and a greater tolerance to temperature differences than the low-power power supply.

22 Claims, 6 Drawing Sheets

(51) Int. Cl.
*G05F 1/10* (2006.01)
*G05F 1/66* (2006.01)
*G05F 1/625* (2006.01)

(52) U.S. Cl.
CPC ........ *G05F 1/66* (2013.01); *G05B 2219/2639* (2013.01)

(58) Field of Classification Search
CPC ............ G05B 19/0425; G05B 19/0428; G05B 2219/26; G05B 2219/2639; H02M 1/08; H02M 1/14; H02M 1/143; H02M 1/15; H02M 1/36; H02M 2001/0003; H02M 2001/0025; H02M 2001/0032; H02M 2001/0035; H02M 2001/0041; H02M 2001/0067; H02M 1/0003; H02M 1/0025; H02M 1/0032; H02M 1/0035; H02M 1/0041; H02M 1/0067; H02M 3/156; G06F 1/26; G06F 1/263; G06F 1/266; G06F 1/32; G06F 1/3203; G06F 1/3206; G06F 1/3243; G06F 1/3293; G06F 1/3296

USPC ................ 323/222–226, 234, 266, 268–275, 323/281–286, 304, 311–317, 351, 907; 361/18; 327/538–543; 713/300–340

See application file for complete search history.

(56) References Cited

U.S. PATENT DOCUMENTS

| | | | |
|---|---|---|---|
| 6,424,128 B1* | 7/2002 | Hiraki | G06F 1/26 323/268 |
| 2005/0274982 A1* | 12/2005 | Ueda | H01L 29/8611 257/E29.328 |
| 2006/0202738 A1* | 9/2006 | Gatta | G05F 1/56 327/427 |
| 2013/0147271 A1* | 6/2013 | Yotsuji | H02J 4/00 307/28 |
| 2013/0169246 A1* | 7/2013 | Shao | G05F 1/563 323/266 |

* cited by examiner

POWER DELIVERY SYSTEM HAVING LOW- AND HIGH-POWER POWER SUPPLIES

BACKGROUND

In a computer system, a power delivery apparatus such as a low dropout (LDO) voltage regulator provides power to various subsystems. Improvements to power delivery apparatuses are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for adjusting a power supply for a device is provided. The technique includes detecting a low-power trigger for a device; switching a power supply for the device from a high-power power supply to a low-power power supply; detecting a low-power trigger for a device; and switching a power supply for the device from the low-power power supply to the high-power power supply, wherein the high-power power supply consumes a larger amount of power than the low-power power supply, and wherein the high-power power supply provides a greater amount of noise reduction and a greater tolerance to temperature differences than the low-power power supply.

Figure 1:
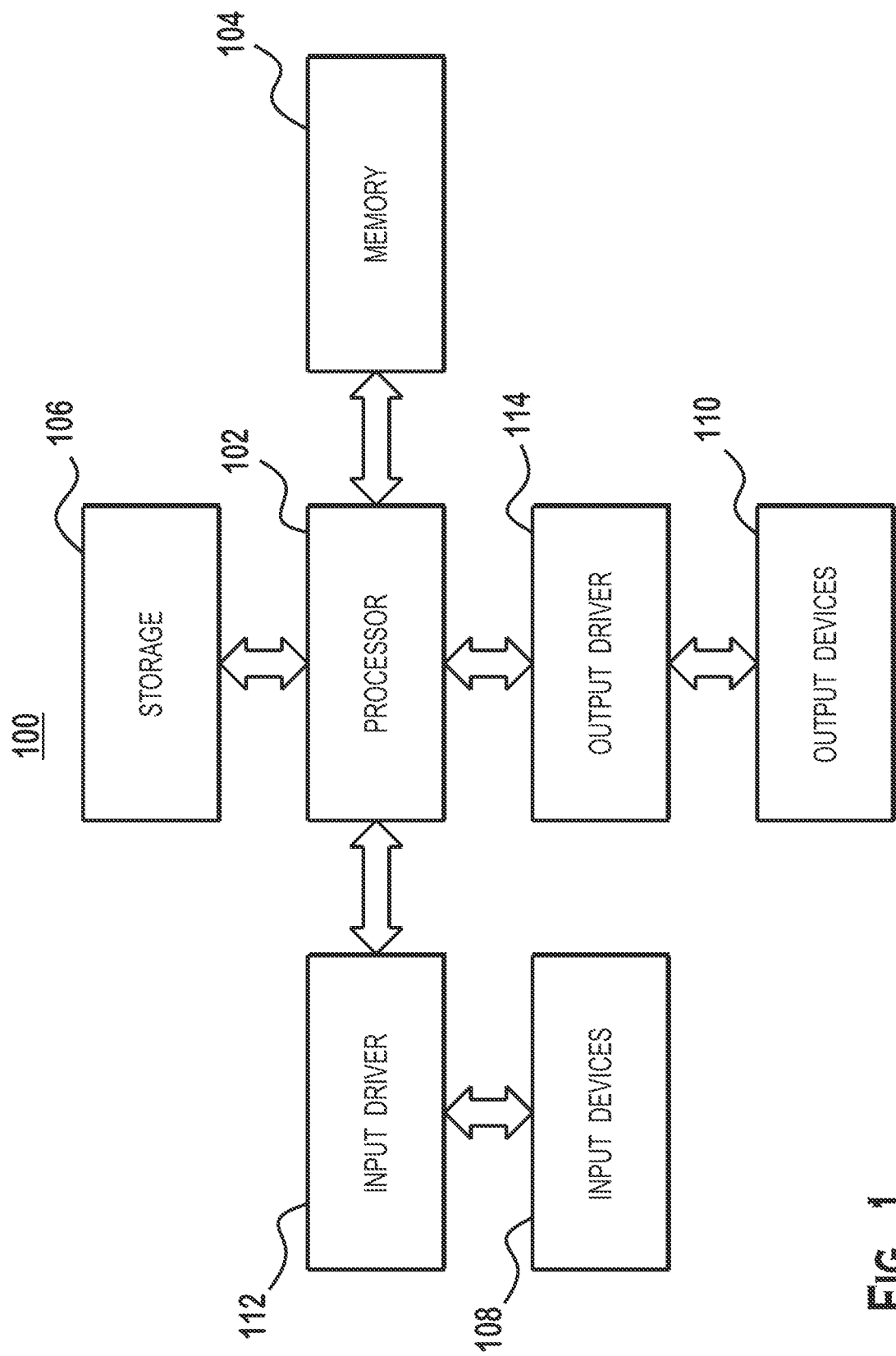
FIG. 1 is a block diagram of an example device in which one or more features of the disclosure can be implemented.

FIG. 1 is a block diagram of an example electronic device 100 in which one or more features of the disclosure can be implemented. In various examples, the electronic device 100 includes a computer, a gaming device, a handheld device, a set-top box, a television, a mobile phone, or a tablet computer. The electronic device 100 includes a processor 102, a memory 104, a storage 106, one or more input devices 108, and one or more output devices 110. The electronic device 100 can also optionally include one or more input drivers 112 and one or more output drivers 114. It is understood that the electronic device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110. It is noted that the input drivers 112 and the output drivers 114 are optional components, and that the electronic device 100 will operate in the same manner if the input drivers 112 and the output drivers 114 are not present. In various examples, all or some of the components of the electronic device 100 are integrated into a single die such as a system on a chip (SOC).

Figure 2:
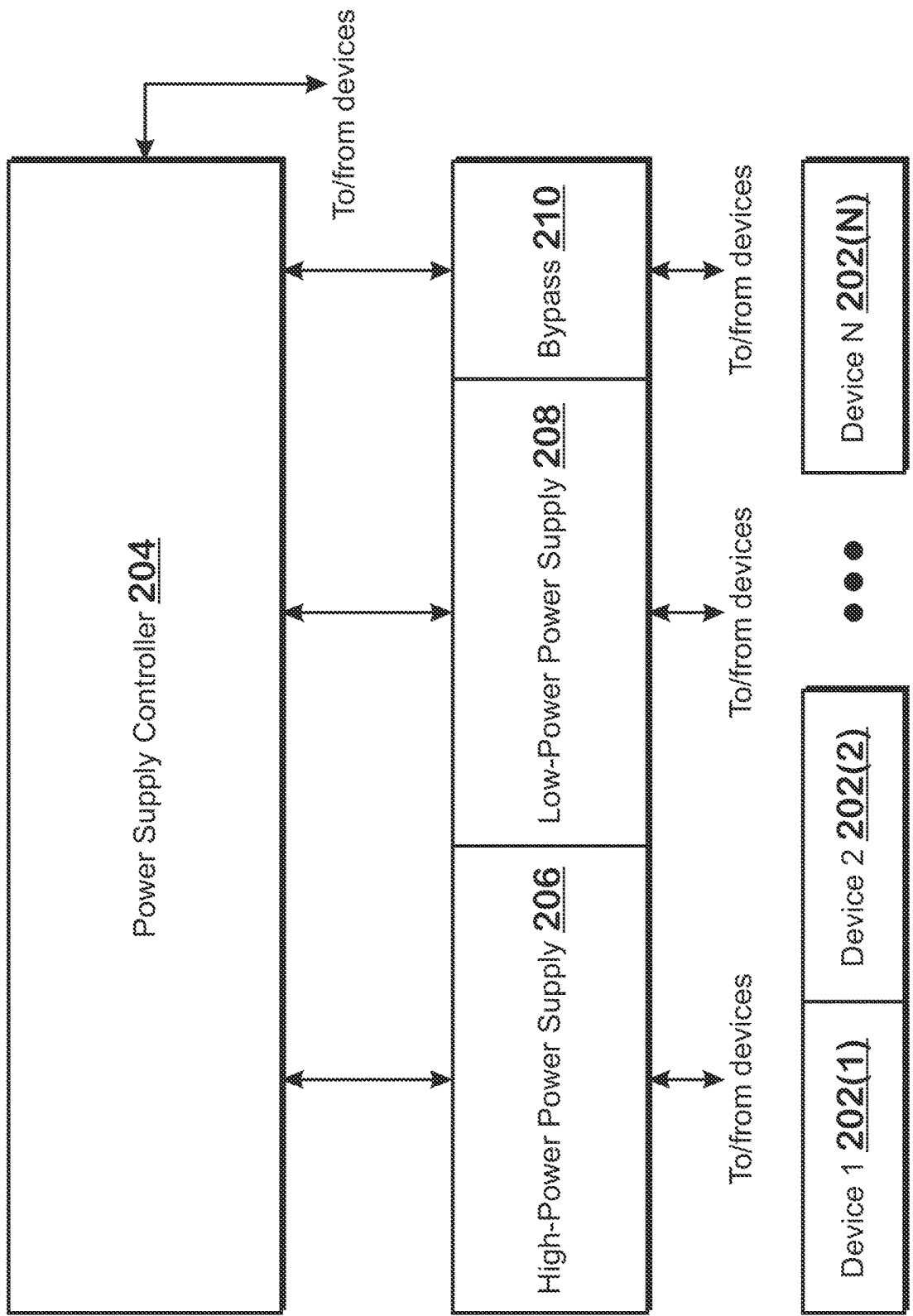
FIG. 2 is a block diagram illustrating aspects of FIG. 1 related to providing a reference voltage for a power supply for each of a plurality of devices of the electronic device of FIG. 1, according to an example.

FIG. 2 is a block diagram illustrating aspects of FIG. 1 related to providing a reference voltage for a power supply for each of a plurality of devices 202 of the electronic device 100 of FIG. 1, according to an example. The devices 202 include subsystems of the electronic device 100 that are powered independently. Examples of these devices 202 in FIG. 1 include input devices 108, output devices 110, input drivers 112, or output drivers 114. Some example input drivers 112 include a universal serial bus ("USB") controller, a network interface controller, a sensor controller, and an audio controller. These examples are also considered output drivers 114. It should be understood that any of a variety of subsystems of the electronic device 100 are in various implementations considered to be represented by the devices 202.

Each of the devices 202 is capable of operating in a normal mode and in a standby or low-power mode. In the normal mode, the device 202 performs standard operations. In the standby mode, the device 202 does not perform standard operations, but is capable of receiving signals that cause the device 202 to power up into the normal mode. In one example, an audio controller is placed into a standby mode after hearing no audio input for a certain amount of time. The audio controller in standby mode, in response to detecting an audio signal, powers up into the normal mode. In another example, a USB controller is placed into standby mode after receiving no signals from devices coupled to the electronic device 100 via a USB connection. Subsequently, in response to receiving a signal from one such device, the USB controller is placed into a normal mode.

The power requirements of a device 202 in the normal mode are different than the power requirements of a device 202 in the standby mode. A voltage regulator is typically used to provide a reference voltage to devices 202, and the voltage regulator also provides power to the devices 202. In the normal mode, typical voltage regulators provide certain features that improve the quality of the reference voltage and of the power supply to the devices 202 in various operating conditions. In general, these features exist to maintain the voltage level of the reference voltage and of the power supply regardless of changes in the amount of current drawn through the voltage regulator and these features also exist to reduce the degree to which noise affects the voltage level of the power supply to the devices 202. However, the aspects of the voltage regulator that provide these features also result in a high idle power draw. In battery-powered devices, a high idle power draw reduces battery life.

For the above reason, a power supply controller 204 controls a high-power power supply 206 and a low-power power supply 208 to provide power to the devices 202. More specifically, the power supply controller 204 monitors the state of the devices 202 and, upon detecting that a low-power trigger has occurred for a device 202 (or all devices 202 that share the same power supply), causes the low-power power supply 208 to supply power to that device 202, rather than the high-power power supply 206. In response to detecting that a high-power trigger has occurred for a device 202, the power supply controller 204 controls the high-power power supply 206 to supply power to that device 202.

A bypass 210 is present in some implementations. The bypass 210 is a circuit that disconnects one or more devices from both of the high-power power supply 206 and the low-power power supply 208. This disconnection allows a device 202 to utilize a different power supply or to be completely powered off when a device 202 requires no power.

Figure 3:
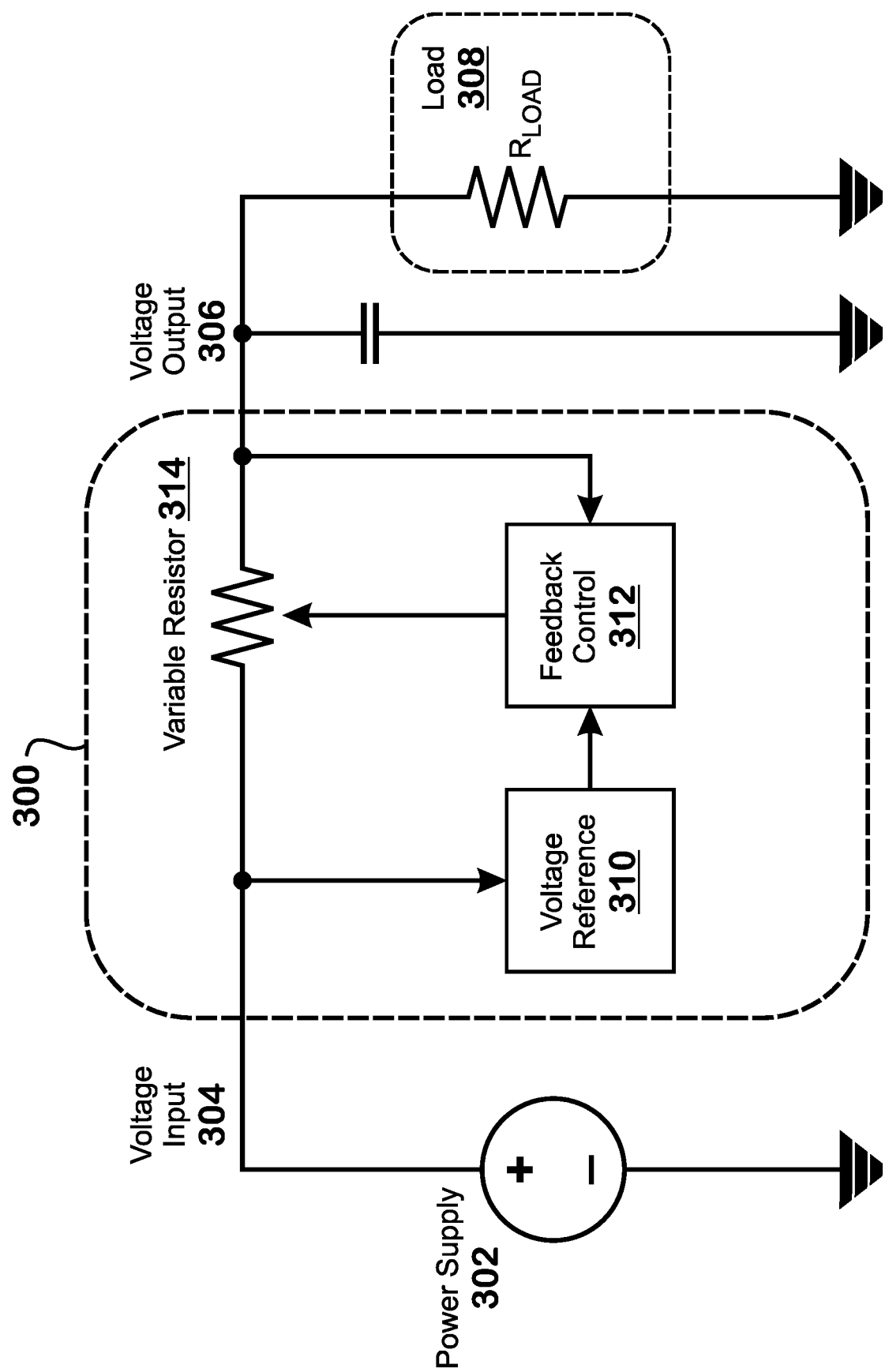
FIG. 3 illustrates a generic low dropout voltage regulator according to an example.

In some examples, the high-power power supply 206 includes a low dropout voltage regulator that uses a bandgap voltage reference and an on-chip decoupling capacitor to provide a steady output voltage in a wide variety of operating conditions (such as in temperature variations, with variable current draw, and the like). FIG. 3 illustrates a generic low dropout voltage regulator according to an example.

In FIG. 3, the low dropout voltage regulator 300 receives an input voltage 304 from a power supply 302 and provides an output voltage 306 to a load 308 (which corresponds to a device 202 in FIG. 2). The low dropout voltage regulator 300 includes a voltage reference 310, a feedback control 312, and a variable resistor 314. The feedback control 312 controls the resistance of the variable resistor 314 based on the voltage at the output 306 and based on the voltage reference 310. As the output voltage 306 decreases, the feedback control 312 measures this change in comparison to the voltage reference 310 and reduces the resistance of the variable resistor, thereby increasing the output voltage 306. As the output voltage 306 increases, the feedback control 312 measures this change in comparison to the voltage reference 310 and increases the resistance of the variable resistor, thereby decreasing the output voltage 306.

The quality of the output voltage 306 depends on the specific manner in which the low dropout voltage regulator 300 is implemented. The "quality" generally means the degree to which the output voltage 306 remains at the desired voltage and does not change in response to circumstances such as changes in temperature and changes in current drawn by the load 308.

In some examples, the high-power power supply 206 includes a bandgap reference voltage as the voltage reference 310. A bandgap reference voltage is a reference voltage that provides a constant voltage regardless of power supply variations, temperature changes, and circuit loading. Thus the quality of the output voltage 306 of a low dropout voltage regulator 300 is high in comparison to some implementations that use a different type of voltage reference 310 (such as a resistor divider voltage reference). However, a bandgap reference voltage also consumes a large amount of power regardless of the current drawn by the load 308.

In addition, in some examples, the high-power power supply 206 includes noise reduction features such as one or more decoupling capacitors at the voltage output node 306. A decoupling capacitor acts as a transient current sink or source that acts in opposition to changes in voltage (i.e., the capacitor stores current in response to an increase in voltage, thereby decreasing the voltage and the capacitor sources current in response to a decrease in voltage, thereby increasing the voltage). Thus a decoupling capacitor serves to reduce the noise at the voltage output node 306. However, decoupling capacitors also increase operating current even where the current drawn by the load 308 is low, because capacitors have relatively high leakage current. In some examples, the high-power power supply 206 includes other techniques that reduce noise of the voltage output 306 (e.g., increased gain and increased bandwidth) at the expense of power.

The low-power power supply 208 does not include various features that are included in the high-power power supply 206. More specifically, the low-power power supply 208 does not include the bandgap reference voltage or the features to reduce voltage noise, each of which consume a significant amount of power even when current draw is very low. In an example, the voltage reference 310 for the low-power power supply 208 is a voltage divider reference voltage. A voltage divider reference voltage includes resistors coupled between a high voltage and a low voltage, and an output at a node between two of these resistors. The power consumption of such a voltage reference is much less than the power consumption of the bandgap reference voltage of the example of the high-power power supply 206. The low-power power supply 208 also does not include noise reduction features such as a decoupling capacitor at the output of the low-power power supply 208 or in other locations. With such a low-power power supply 208 powering a device 202 when that device 202 is in a standby mode, the power consumption is much lower than if a high-power power supply 206 were powering the device 202.

In some implementations, the two or more power supplies (such as a low-power power supply 208 and a high-power power supply 206) share the same input power supply 302.

Figure 4A:
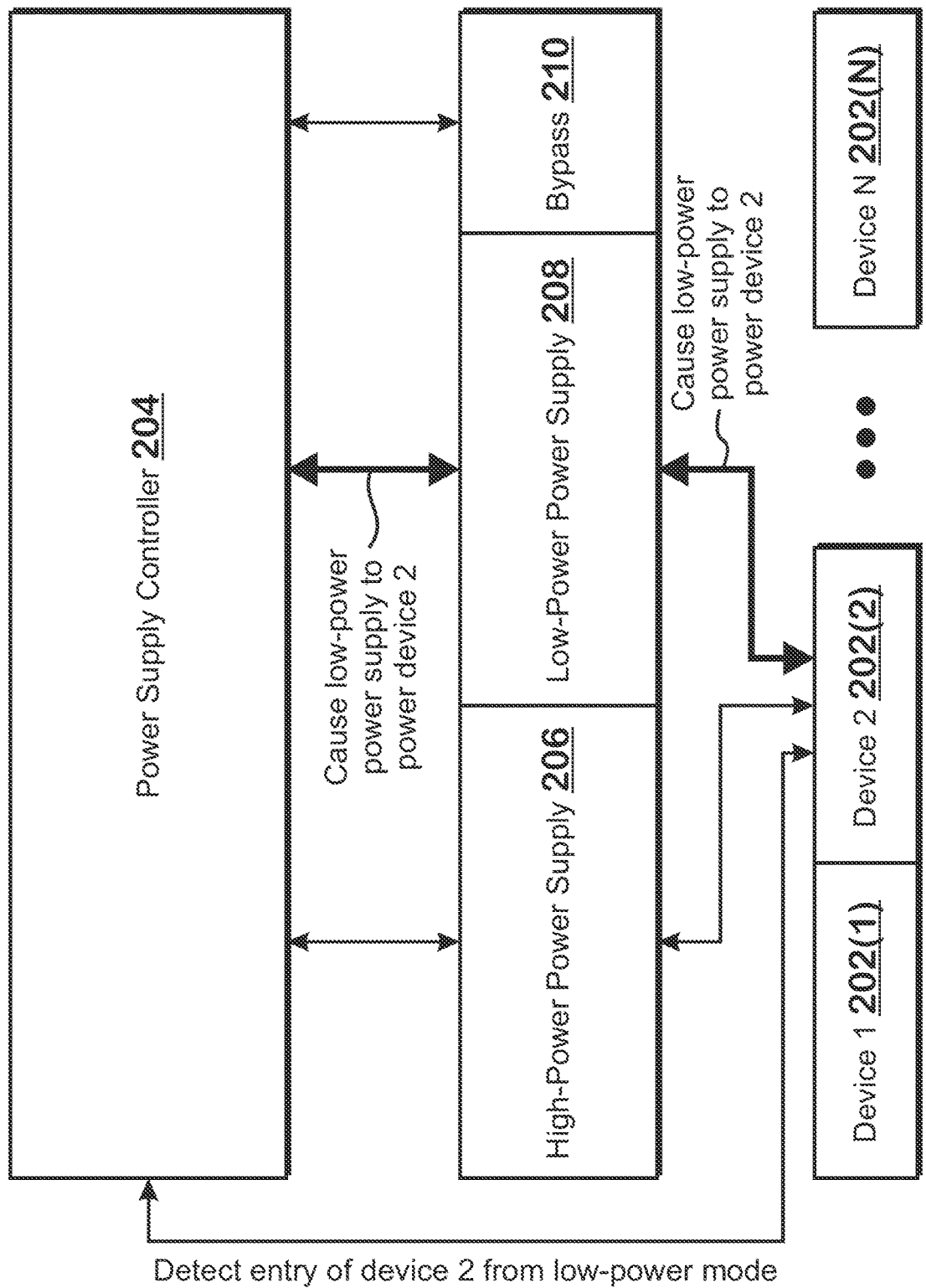
FIG. 4A illustrates an operation of changing the power supply for a device from the high-power power supply to the low-power power supply, according to an example.

FIG. 4A illustrates an operation of changing the power supply for a device 202 from the high-power power supply 206 to the low-power power supply 208, according to an example. The power supply controller 204 monitors devices 202 and, upon detecting a low-power trigger for a device 202, controls the device 202 to be powered by the low-power power supply 208 instead of the high-power power supply 206.

In one example of a low-power trigger, the power supply controller 204 receives an indication from a processor (e.g., processor 102) that a device 202 has entered a low-power state. In another example, the power supply controller 204 determines that present current draw of the device 202 is below a power-down threshold. In another example, the power supply controller 204 determines, based on present current draw and change in current draw over time, that the current draw of the device 202 will be below a threshold within a threshold amount of time. In another example, the power supply controller 204 combines any of the information discussed above to identify a low-power trigger.

Figure 4B:
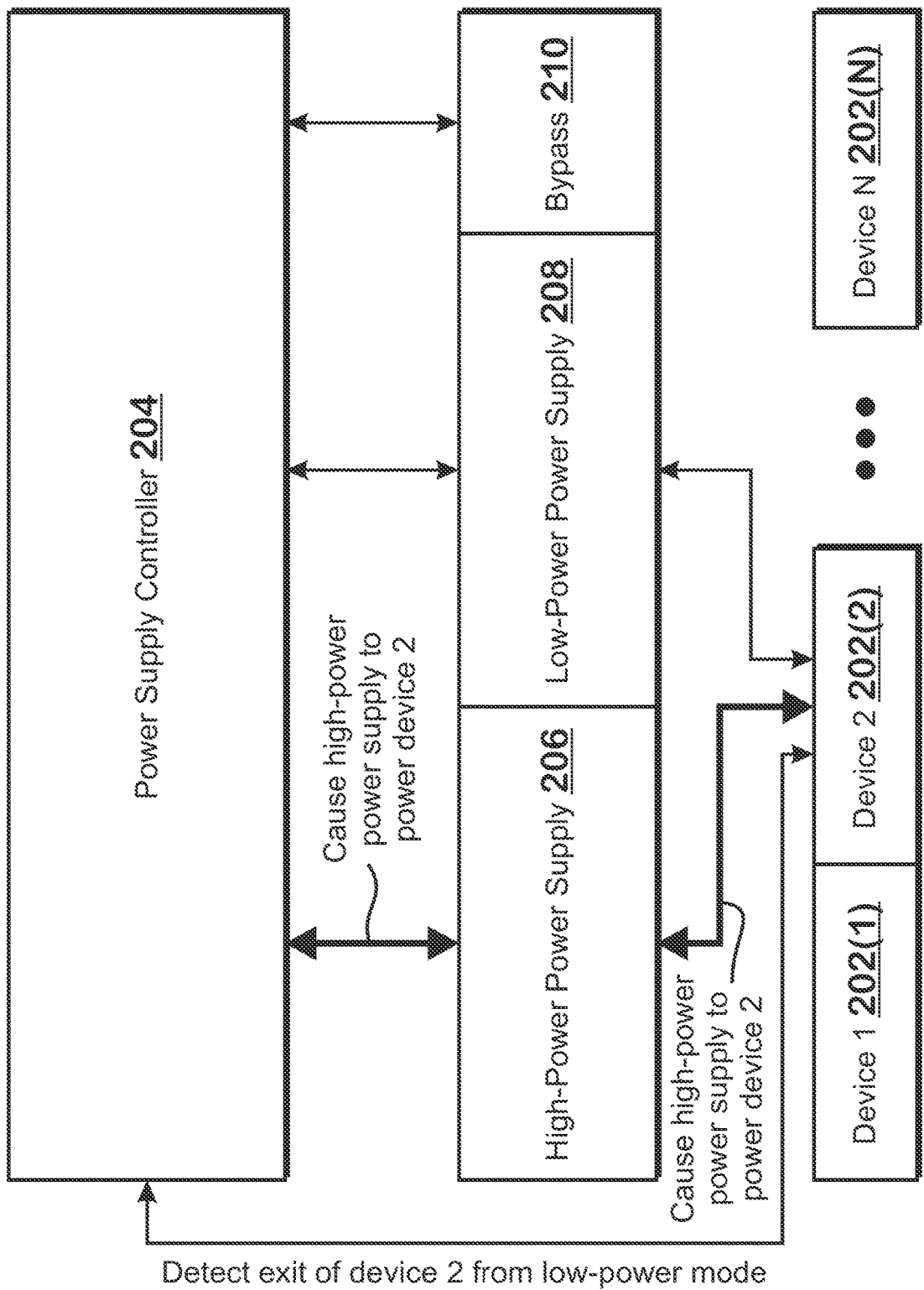
FIG. 4B illustrates an operation of changing a power supply for a device from a low-power power supply to a high-power power supply, according to an example.

FIG. 4B illustrates an operation of changing the power supply for a device 202 from the low-power power supply 208 to the high-power power supply 206, according to an example. The power supply controller 204 monitors devices 202 and, upon detecting a high-power trigger for a device 202, controls the device 202 to be powered by the high-power power supply 206 instead of the low-power power supply 208.

In an example high-power trigger, the power supply controller 204 receives an indication from a processor that a device 202 has entered a powered-up state. In another example, the power supply controller 204 determines that the present current draw of the device 202 is above a power-up threshold. In another example, the power supply controller 204 determines, based on present current draw and change in current draw over time, that the current draw of the device 202 will be above a threshold in within a threshold amount of time. In another example, the power supply controller 204 combines any of the information discussed above to identify a high-power threshold.

Figure 5:
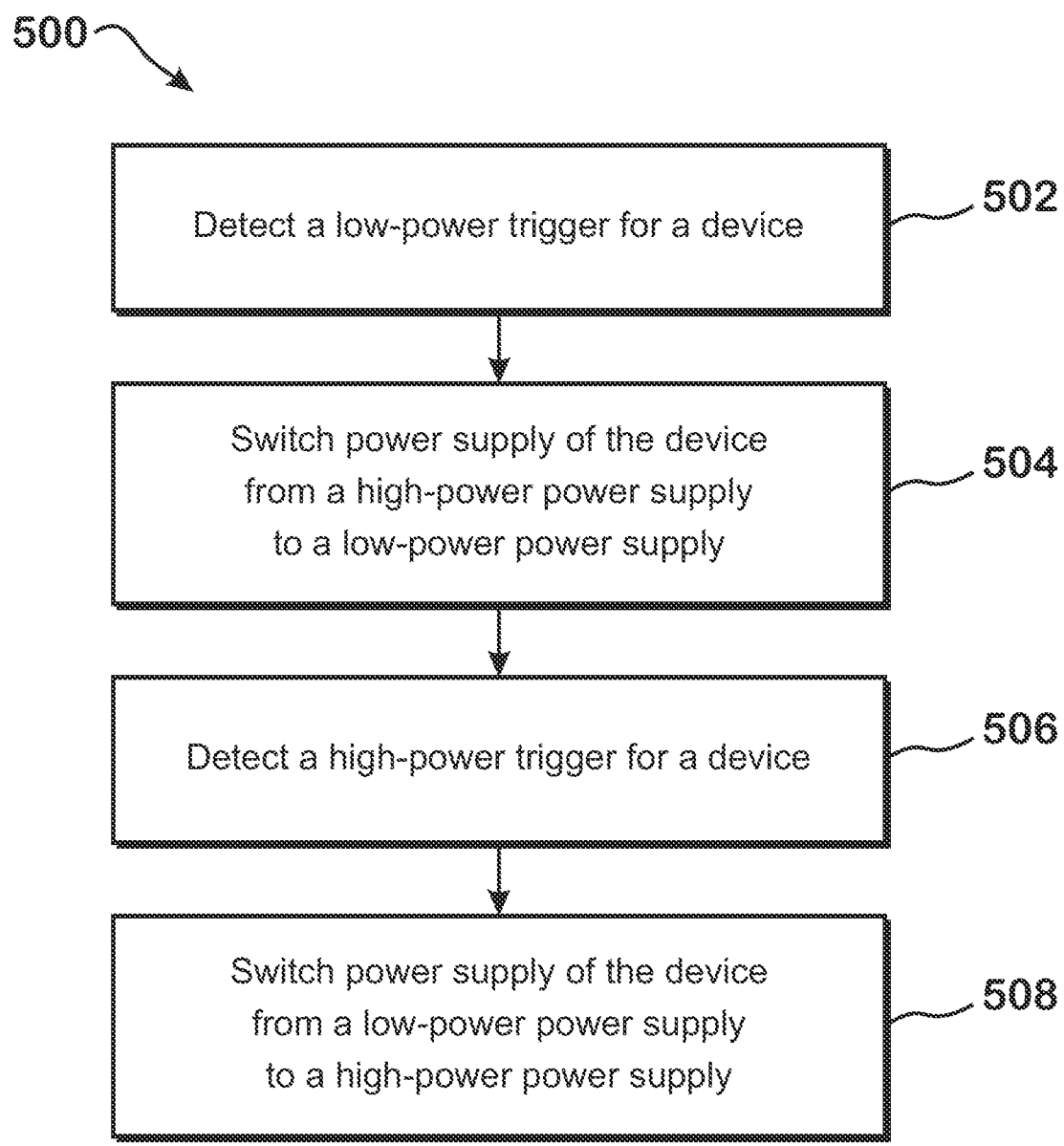
FIG. 5 is a flow diagram of a method for adjusting a power supply for a device, according to an example.

FIG. 5 is a flow diagram of a method for adjusting a power supply for a device, according to an example. Although described with respect to the system of FIGS. 1-4B, those of skill in the art will understand that any system, configured to perform the steps of the method 500 in any technically feasible order, falls within the scope of the present disclosure.

The method 500 begins at step 502, where the power supply controller 204 detects a low-power trigger for a device 202. As described elsewhere herein, one example low-power trigger includes the power supply controller 204 receiving an indication from a processor that the device 202 has entered a low-power state. Another example includes the power supply controller 204 determining that present current draw of the device 202 is below a power-down threshold. Another example includes the power supply controller 204 determining, based on present current draw and change in current draw over time, that the current draw of the device 202 will be below a threshold within a threshold amount of time. Another example includes the power supply controller 204 combining any of the information discussed above to identify a low-power trigger.

At step 504, the power supply controller 204 switches the power supply of the device 202 from the high-power power supply 206 to the low-power power supply 208. As described elsewhere herein, the high-power power supply 206 differs from the low-power power supply in that the high-power power supply 206 provides a higher quality of power supply than the low-power power supply, but the high-power power supply 206 consumes more power when idle than the low-power power supply 208. A "higher quality of power supply" means that the voltage output of the high-power power supply is more even, containing less noise, and being more temperature independent than the voltage output of the low-power power supply.

At step 506, the power supply controller 204 detects a high-power trigger for the device 202. As described elsewhere herein, an example high-power trigger includes the power supply controller 204 receiving an indication from a processor that the device 202 has entered a powered-on state. Another example of a high-power trigger including the power supply controller 204 determining that the present current draw of the device 202 is above a power-up threshold. Another example of a high-power trigger includes the power supply controller 204 determining, based on present current draw and change in current draw over time, that the current draw of the device 202 will be above a threshold in within a threshold amount of time. Another example of a high-power trigger includes the power supply controller 204 combining any of the information discussed above to identify a high-power threshold. At step 508, the power supply controller 204 switches the power supply powering the device 202 from the low-power power supply 208 to the high-power power supply 206.

In various implementations, a single system-on-chip has multiple devices 202 using multiple different voltage regulators. In some implementations, the power supply controller 204 ensures that the voltage regulators for standby wake enabled devices 202 is in low power mode on system-on-chip standby entry.

In some implementations, where a low-power power supply 208 is not used, the low-power power supply 208 is powered off, by de-powering the voltage reference 310 and feedback control 312.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input drivers 112, the input devices 108, the output drivers 114, the output devices 110, the power supply controller 204, the high-power power supply 206, the low-power power supply 208, the bypass 210, and devices 202), may be implemented as, where appropriate, a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for concurrently providing power to a first device and a second device, the method comprising: detecting a low-power trigger for the first device; switching a power source for the first device from a high-power power supply to a low-power power supply in response to the low-power trigger being detected for the first device, wherein the high-power power supply includes an on-chip decoupling capacitor at an output node and a low dropout voltage regulator that includes a variable resistor and a bandgap reference voltage, wherein the variable resistor is controlled based on feedback between a power supply node and the output node when the high-power power supply provides power to either the first device or the second device; detecting a high-power trigger for the second device; and switching a power source for the second device from the low-power power supply to the high-power power supply in response to the high-power trigger detected from the second device, wherein the low-power power supply does not include a decoupling capacitor and does not include the bandgap reference voltage; wherein the high-power power supply consumes a larger amount of power than the low-power power supply and provides a greater amount of noise reduction and a greater tolerance to temperature differences than the low-power power supply.

2. The method of claim 1, wherein the low-power trigger includes:
receiving an indication from a processor that the first device has entered a low-power state.

3. The method of claim 1, wherein the low-power trigger includes:
determining that a present current draw of the first device is below a power-down threshold.

4. The method of claim 1, wherein the low-power trigger includes:
determining, based on a present current draw of the first device and a change in current draw of the first device over time, that the current draw of the first device will be below a threshold within a threshold amount of time.

5. The method of claim 1, wherein the high-power trigger includes:
receiving an indication from a processor that the second device has entered a powered-up state.

6. The method of claim 1, wherein the high-power trigger includes:
determining that a present current draw of the second device is above a power-up threshold.

7. The method of claim 1, wherein the high-power trigger includes:
determining, based on a present current draw of the second device and change in current draw of the second device over time, that the current draw of the second device will be above a threshold in within a threshold amount of time.

8. The method of claim 1, wherein:
the high-power power supply comprises a high-power low dropout that includes the bandgap reference voltage; and
the low-power power supply comprises a low-power low dropout that does not include the bandgap reference voltage.

9. The method of claim 8, wherein the high-power low dropout comprises:
a voltage reference that comprises the bandgap reference voltage;
the variable resistor; and
a feedback control coupled to the voltage reference, wherein the feedback control is configured to adjust resistance of the variable resistor based on voltage at an output of the high-power low dropout in comparison to the voltage reference.

10. The method of claim 1, wherein the variable resistor is coupled between a high power supply and the output node.

11. An apparatus, comprising:
a high-power power supply, wherein the high-power power supply includes an on-chip decoupling capacitor at an output node and a low dropout voltage regulator that includes a variable resistor and a bandgap reference voltage, wherein the variable resistor is controlled based on feedback between a power supply node and the output node when the high-power power supply provides power to either a first device or a second device;
a low-power power supply, wherein the low-power power supply does not include a decoupling capacitor and does not include the bandgap reference voltage; and
a power supply controller configured to concurrently provide power to the first device and the second device, wherein the power supply controller is, configured to:
detect a low-power trigger for the first device;
switch a power source for the first device from the high-power power supply to the low-power power supply in response to the low-power trigger being detected for the first device;
detect a high-power trigger for the second device; and
switch a power source for the second device from the low-power power supply to the high-power power supply in response to the high-power trigger detected from the second device;
wherein the high-power power supply consumes a larger amount of power than the low-power power supply and provides a greater amount of noise reducing and a greater tolerance to temperature differences than the low-power power supply.

12. The apparatus of claim 11, wherein the low-power trigger includes:
receiving an indication from a processor that the first device has entered a low-power state.

13. The apparatus of claim 11, wherein the low-power trigger includes:
determining that a present current draw of the first device is below a power-down threshold.

14. The apparatus of claim 11, wherein the low-power trigger includes:
determining, based on a present current draw of the first device and a change in current draw of the first device over time, that the current draw of the first device will be below a threshold within a threshold amount of time.

15. The apparatus of claim 11, wherein the high-power trigger includes:
receiving an indication from a processor that the second device has entered a powered-up state.

16. The apparatus of claim 11, wherein the high-power trigger includes:
determining that a present current draw of the second device is above a power-up threshold.

17. The apparatus of claim 11, wherein the high-power trigger includes:
determining, based on a present current draw of the second device and a change in current draw of the second device over time, that the current draw of the second device will be above a threshold in within a threshold amount of time.

18. The apparatus of claim 11, wherein:
the high-power power supply comprises a high-power low dropout that includes the bandgap reference voltage; and
the low-power power supply comprises a low-power low dropout that does not include the bandgap reference voltage.

19. The apparatus of claim 18, wherein the high-power low dropout comprises:
a voltage reference that comprises the bandgap reference voltage;
the variable resistor; and
a feedback control coupled to the voltage reference, wherein the feedback control is configured to adjust resistance of the variable resistor based on voltage at an output of the high-power low dropout in comparison to the voltage reference.

20. The apparatus of claim 11, wherein the variable resistor is coupled between a high power source and the output node.

21. A non-transitory computer-readable medium storing instructions for concurrently providing power to a first device and a second device, the instructions when executed by a processor, cause the processor to execute a method comprising: detecting a low-power trigger for the first device; switching a power source for the first device from a high-power power supply to a low-power power supply in response to the low-power trigger being detected for the first device, wherein the high-power power supply includes an on-chip decoupling capacitor at an output node and a low dropout voltage regulator that includes a variable resistor and a bandgap reference voltage, wherein the variable resistor is controlled based on feedback between a power supply node and the output node when the high-power power supply provides power to either the first device or the second device; detecting a high-power trigger for the second device; and switching a power source for the second device from the low-power power supply to the high-power power supply in response to the high-power trigger detected from the second device, wherein the low-power power supply does not include a decoupling capacitor and does not include the bandgap reference voltage; wherein the high-power power supply consumes a larger amount of power than the low-power power supply and provides a greater amount of noise reduction and a greater tolerance to temperature differences than the low-power power supply.

22. The non-transitory computer-readable medium of claim 21, wherein the low-power trigger includes:
receiving an indication from the processor that the first device has entered a low-power state.

* * * * *